United States Patent [19]

Bildhauer et al.

[11] Patent Number: 5,534,604
[45] Date of Patent: Jul. 9, 1996

[54] COPOLYMERS BASED ON ETHYLENICALLY UNSATURATED DICARBOXYLIC ANHYDRIDES, LONG-CHAIN OLEFINS AND FLUOROOLEFINS

[75] Inventors: Michael Bildhauer, Neu-Isenburg; Rainer Kupfer, Hattersheim; Günther Siebott, Frankfurt am Main; Bernhard Mees, Eppstein; Herbert Friedrich, Heusenstamm, all of Germany

[73] Assignee: Hoechst, Frankfurt am Main, Germany

[21] Appl. No.: 436,156

[22] Filed: May 5, 1995

[30] Foreign Application Priority Data

May 10, 1994 [DE] Germany .................. 44 16 415.7

[51] Int. Cl.$^6$ ........................... C08F 14/18
[52] U.S. Cl. ........................... 526/253
[58] Field of Search ........................... 526/253

[56] References Cited

U.S. PATENT DOCUMENTS

| | | |
|---|---|---|
| 2,542,542 | 2/1951 | Lippincott et al. . |
| 3,449,250 | 6/1969 | Fields . |
| 3,506,625 | 4/1970 | Patinkin et al. . |
| 3,876,729 | 4/1975 | Mueller . |
| 4,079,041 | 3/1978 | Baumann et al. ............ 526/263 |
| 4,617,363 | 10/1986 | Su .......................... 526/253 |
| 4,668,749 | 5/1987 | Graun et al. ............... 526/253 |
| 4,959,077 | 9/1990 | Martischius . |
| 4,997,893 | 3/1991 | Suling . |
| 5,279,613 | 1/1994 | Schaffer et al. . |

FOREIGN PATENT DOCUMENTS

| | | |
|---|---|---|
| 0307815 | 10/1987 | European Pat. Off. . |
| 0324354 | 7/1989 | European Pat. Off. . |
| 0412389 | 2/1991 | European Pat. Off. . |
| 7215573 | 12/1972 | France . |
| 58-034867 | 3/1983 | Japan . |
| 60-181155 | 9/1985 | Japan . |
| 6910232 | 1/1971 | Netherlands . |

OTHER PUBLICATIONS

European Search Report, No. 95106335.3, Sep. 12, 1995.
Das Leder, 41, Aug., 1990 L. Schlosser.

Primary Examiner—Joseph L. Schofer
Assistant Examiner—N. Sarafin
Attorney, Agent, or Firm—Connolly and Hut

[57] ABSTRACT

Copolymers based on ethylenically unsaturated dicarboxylic anhydrides, long-chain olefins and fluoroolefins Copolymers containing 10 to 60% by weight of bivalent structural units of the formula A

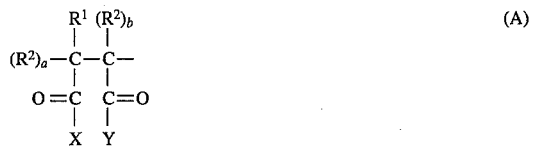

wherein $R^1$ and $R^2$, independently of one another, are hydrogen or $C_1$–$C_6$-alkyl, a and b are zero or one and a+b is one, X and Y are identical or different and are the group —N—HR$^3$, where $R^3$ is $C_1$–$C_{40}$-alkyl, $C_3$–$C_{40}$-alkenyl, $C_5$–$C_{20}$-cycloalkyl or $C_6$–$C_{18}$-aryl, the group —N—(R$^3$)$_2$, where $R^3$ are identical or different and have the abovementioned meaning, and/or the group —O—R$^4$, where $R^4$ is hydrogen, an alkali metal cation, one equivalent of an alkaline earth metal ion, a cation of the formula $H_2N^{\oplus}(R^3)_2$ or $H_3N^{\oplus}R^3$, $C_1$–$C_{40}$-alkyl, $C_5$–$C_{20}$-cycloalkyl or $C_6$–$C_{18}$-aryl, 30 to 89% by weight of bivalent structural units of the formula B

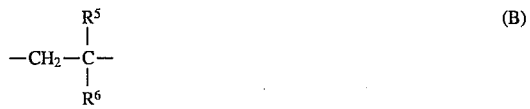

wherein $R^5$ is hydrogen or $C_1$–$C_4$-alkyl and $R_6$ is $C_6$–$C_{40}$-alkyl or $C_6$–$C_{18}$-aryl, and 1 to 20% by weight of bivalent structural units of the formula C

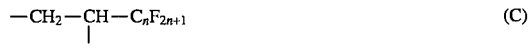

wherein n is a number from 6 to 24.

The invention also relates to a process for the preparation of these copolymers and to the utilization thereof.

4 Claims, No Drawings

COPOLYMERS BASED ON ETHYLENICALLY UNSATURATED DICARBOXYLIC ANHYDRIDES, LONG-CHAIN OLEFINS AND FLUOROOLEFINS

Copolymers based on ethylenically unsaturated dicarboxylic anhydrides, long-chain olefins and fluoroolefins The production of leather is a complex process involving a plurality of successive steps. In one of the first steps, the so-called "lime" the meat residues, bristles and hairs adhering to the raw hide are removed by a chemical method. Further important steps are tanning and greasing. In order to obtain supple leather, the latter must be greased. This process is referred to as "fatliquoring" by a person skilled in the art.

Traditional leather fatliquors are based on animal or vegetable oils and fats, for example fish oil and palm oil, or petrochemical products, such as paraffins and $\alpha$-olefins having a chain length of more than 20 carbon atoms. By chemical transformation, for example by oxysulfitation or sulfochlorination, these compounds are rendered water-emulsifiable and can be used in this form as a fatliquor.

Over the past few years, copolymers have increasingly been used as leather fatliquors. EP-A-0 372 746 describes the use of amphiphilic copolymers, i.e. copolymers which have both hydrophilic and lipophilic properties, for the treatment of leather. The copolymers described there contain more than 10% by weight of at least one hydrophilic monomer and more than 50% by weight of at least one hydrophobic comonomer. The hydrophilic monomers used are water-soluble, ethylenically unsaturated, acidic or basic monomers and mixtures thereof. Examples of such monomers are: (meth) acrylic acid, itaconic acid, fumaric acid, maleic acid and the anhydrides thereof, preferably acrylic acid. Suitable hydrophobic comonomers which are used are primary alkenes, for example $C_{12}$–$C_{18}\alpha$-olefins. The amphiphilic copolymers are used as leather fatliquors in the form of an at least 1% strength by weight aqueous emulsion, based on the weight of the tanned hide.

US-A-5 279 613 describes the use of salts of copolymers of $C_8$–$C_{40}$-monoolefins with ethylenically unsaturated $C_4$–$C_8$-dicarboxylic anhydrides as agents for the water repellent treatment of leather and pelts.

However, these known copolymers have various disadvantages. Their use leads to a certain loose-grain character of the leather, i.e. the visual appearance and shape of the leather are adversely affected by creasing. Furthermore, with these agents water repellency of the leather is achieved under dynamic load (dynamic water repulsion) but adequate water repellency under static load (static water repulsion) is not achieved.

The article by L. Schösser (Fachzeitschrift für die Chemie und Technologie der Lederherstellung [Journal for the Chemistry and Technology of Leather Production], page 149 et seq., 1990) describes the use of aqueous emulsions of organic fluorine compounds for the simultaneous oil- and water-repellent and dirt-repellent treatment of upholstery leather. The organic fluorine compounds described there contain an aliphatic hydrocarbon group in which all of the hydrogen atoms are exchanged for fluorine atoms. The leathers treated with such emulsions also exhibit static water repulsion (so-called "water droplet-fast" leather) in addition to air and water vapor permeability owing to the reduced wettability. However, the property profile described above for the leathers treated with organic fluorine compounds necessitated prior fatliquoring of the leather.

It is the object of the present invention to provide compounds by means of which improved static and dynamic water repellency of leathers and pelts is achieved.

The invention relates to copolymers containing 10 to 60, preferably 20 to 40%, by weight of bivalent structural units of the formula A

wherein
$R^1$ and $R^2$, independently of one another, are hydrogen or $C_1$–$C_6$-alkyl, preferably methyl,
a and b are zero or one and a+ b is one,
X and Y are identical or different and are the group —N—HR$^3$,
where $R^3$ is $C_1$–$C_{40}$-alkyl, preferably $C_3$–$C_{30}$-alkyl, $C_3$–$C_{40}$-alkenyl, preferably $C_3$–$C_{30}$-alkenyl, $C_5$–$C_{20}$-cycloalkyl or $C_6$–$C_{18}$-aryl, the group —N—($R^3$)$_2$,
where $R^3$ are identical or different and have the abovementioned meaning, and/or the group —O—$R^4$,
where $R^4$ is hydrogen, an alkali metal cation, one equivalent of an alkaline earth metal ion, a cation of the formula $H_2N^{\oplus}(R^3)_2$ or $H_3N^{\oplus}R^3$, $C_1$–$C_{40}$-alkyl, $C_5$–$C_{20}$-cycloalkyl or $C_6$–$C_{18}$-aryl, 30 to 89, preferably 50 to 79%, by weight of bivalent structural units of the formula B

wherein
$R^5$ is hydrogen or $C_1$–$C_4$-alkyl and
$R_6$ is $C_6$–$C_{40}$-alkyl or $C_6$–$C_{18}$-aryl, and
1 to 20, preferably 1 to 10%, by weight of bivalent structural units of the formula C

where
n is a number from 6 to 24, preferably 6 to 20, particularly preferably 6 to 12.

The abovementioned alkyl, cycloalkyl and aryl radicals may be unsubstituted or substituted. Suitable substituents of the alkyl and aryl radicals are, for example, ($C_1$–$C_6$)-alkyl, halogens, such as fluorine, chlorine, bromine and iodine, preferably chlorine, and ($C_1$–$C_6$)alkoxy.

According to the invention, alkyl and alkenyl ($R^3$, $R^4$) are in general a straight-chain or branched hydrocarbon radical having 1–40, preferably 3–30, carbon atoms. The following may be mentioned specifically: n-hexyl, n-octyl, decyl, dodecyl, tetradecyl, hexadecyl, octadecyl, dodecenyl, tetrapropenyl, tetradecenyl, pentapropenyl, hexadecenyl, octadecenyl and eicosanyl or mixtures, such as coconut alkyl, tallow fatty alkyl and behenyl.

According to the invention, cycloalkyl ($R^3$, $R^4$) is in general a cyclic aliphatic radical having 5–20 carbon atoms. Preferred cycloalkyl radicals are cyclopentyl and cyclohexyl.

According to the invention, an alkali metal cation is in general a sodium, lithium or potassium metal ion. According to the invention, an alkaline earth metal cation is in general a magnesium, calcium or barium metal ion.

The copolymers according to the invention comprise the bivalent structural units A, B and C. They contain only the terminal groups formed in the polymerization as a result of initiation, inhibition and chain termination.

Specifically, the structural unit A is derived from α,β-unsaturated dicarboxylic anhydrides of the general formulae D and/or E

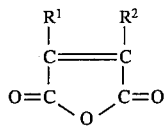
(D)

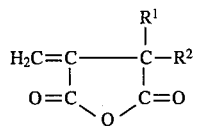
(E)

such as maleic anhydride, itaconic anhydride or citraconic anhydride, preferably maleic anhydride.

The structural unit B is derived from the α,β-unsaturated compounds of the general formula F.

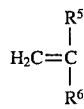
(F)

The following α,β-unsaturated compounds may be mentioned as examples: styrene, α-methylstyrene, dimethylstyrene, α-ethylstyrene, diethylstyrene, isopropylstyrene, tert-butylstyrene, diisobutylene and α-olefins, such as decene, dodecene, tetradecene, pentadecene, hexadecene, octadecene, $C_{20}$-α-olefin, $C_{24}$-α-olefin, $C_{30}$-α-olefin, tripropenyl, tetrapropenyl, pentapropenyl and mixtures thereof. α-Olefins having 10 to 24 carbon atoms and styrene are preferred, α-olefins having 12 to 20 carbon atoms being particularly preferred.

The structural unit C is derived from perfluorinated olefins, preferably monoolefins of the formula G.

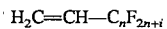
(G)

The structural unit A contains the groups —$NHR^3$, —$N(R^3)_2$ and/or —$OR^4$, which are derived from primary amines of the formula (H) $NH_2R^3$, the secondary amines of the formula (j) or the alcohols of the formula (K) HO—$R^4$.

The following may be mentioned as examples of primary amines: ethylamine, n-propylamine, isopropylamine, n-butylamine, isobutylamine, 2-ethylhexylamine, n-hexylamine, n-octylamine, n-tetradecylamine, n-hexadecylamine, tallow fatty amine, stearylamine, oleylamine or N,N-dimethylaminopropylenediamine, cyclohexylamine, dehydroabietylamine and mixtures thereof.

The following may be mentioned as examples of secondary amines: dimethylamine, diethylamine, di-n-propylamine, diisopropylamine, di-n-butylamine, diisobutylamine, dihexylamine, di-n-octylamine, dicyclohexylamine, di-methylcyclohexylamine, di-2-ethylhexylamine, didecylamine, diisotridecylamine, ditetradecylamine, distearylamine, di-(coconut fatty) amine, di-(tallow fatty) amine and mixtures thereof.

For the purposes of the invention, relatively short-chain and/or relatively long-chain alcohols ($C_6$–$C_{40}$) of the general formula (K)

are used. Alcohols of this type are known per se. n-Butanol, n-hexanol, n-octanol, n-dodecanol and, as relatively long-chain alcohols, stearyl alcohol, behenyl alcohol or the alcohols known under the name ®Alfole (from Condea) and having a carbon chain length of up to 40 carbon atoms may be mentioned as examples.

According to the invention, a cation ($R^4$) is an alkali metal ion, one equivalent of an alkaline earth metal ion or an ammonium ion of the formula $H_2N^{\oplus}(R^3)_2$ or $H_3N^{\oplus}R^3$.

The copolymers according to the invention usually have molecular weights (weight average, $M_w$) of 500 to 20,000 g/mol (determined by means of GPC).

The invention also relates to a process for the preparation of copolymers based on ethylenically unsaturated dicarboxylic anhydrides, long-chain olefins and fluoroolefins, which comprises first polymerizing monomers of the general formulae D and/or E

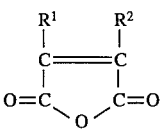
(D)

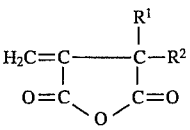
(E)

where $R^1$ and $R^2$, independently of one another, are hydrogen or $C_1$–$C_6$-alkyl, monomers of the general formula F

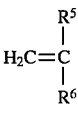
(F)

where
$R^5$ is hydrogen or $C_1$–$C_4$-alkyl and
$R^6$ is $C_6$–$C_{40}$-alkyl or $C_6$–$C_{18}$-alkyl, and monomers of the general formula G

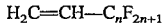
(G)

where
n is a number from 6 to 24, with one another at a temperature in the range from 120° to 300° C. and then carrying out solvolysis of the anhydride groups of the copolymers obtained.

The polymerization is carried out by known batchwise or continuous polymerization processes, such as mass, suspension, precipitation or solution polymerization, and initiation with suitable free radical chain initiators, for example hydroperoxides, peroxides or azo compounds, such as dilauroyl peroxide, dibenzoyl peroxide, tert-butyl perpivalate, tert-butyl permaleate, tert-butyl perbenzoate, dicumyl peroxide, tert-butyl cumyl peroxide, di-tert-butyl peroxide, cumyl hydroperoxide, tert-butyl hydroperoxide, 2,2'-azobis(2-methylpropanonitrile), 2,2'-azobis( 2-methylbutyronitrile) and mixtures with one another. In general, these initiators are used in amounts of 0.1 to 20% by weight, preferably 0.2 to 10% by weight, based on the monomers used in the polymerization.

The molar ratios of the α,β-unsaturated dicarboxylic anhydrides, α,β-unsaturated compounds and perfluorinated olefins are in general 1:0.5–2:0.01–0.5, preferably 1:0.9–1.1:0.03–0.2.

The polymerization is carried out as a rule at temperatures of 40°–400° C., preferably 80°–250° C., pressure expediently being employed when α,β-unsaturated compounds or solvents having boiling points below the polymerization temperature are used. The polymerization is expediently carried out in the absence of air, for example under nitrogen, since oxygen interferes with the polymerization. In choosing the initiator or the initiator system, it is expedient to ensure that the half-life of the initiator or of the initiator system is less than 3 hours at the chosen polymerization temperature.

To obtain low molecular weight copolymers ($M_w$: 500 to 2,000 g/mol), it is often expedient to work in the presence of regulators known per se. Suitable regulators are, for example, organic mercapto compounds, such as 2-mercaptoethanol, 2-mercaptopropanol, mercaptoacetic acid, mercaptopropionic acid, tert-butyl mercaptan, n-butyl mercaptan, n-octyl mercaptan, n-dodecyl mercaptan and tert-dodecyl mercaptan, which are used in general in amounts of 0.1% by weight to 10% by weight.

Apparatuses suitable for polymerization are, for example, conventional stirred vessels having, for example, anchor stirrers, paddle stirrers, impeller stirrers or multi-stage impulse countercurrent agitators and, for the continuous preparation, stirred vessel cascades, stirred reactors or static mixers.

A preferred process for the preparation of the copolymers according to the invention is mass polymerization. This is preferably carried out at temperatures of 80° to 300° C., particularly preferably 120° to 200° C. The polymerization conditions are chosen according to the molecular weight which the copolymers are to have. Polymerization at high temperatures gives copolymers having low molecular weights whereas polymers having higher molecular weights are formed at lower polymerization temperatures. The amount of the polymerization initiator also has an effect on the molecular weight. In general, 0.01 to 5% by weight, based on the monomers used in the polymerization, of free radical polymerization initiators are required. Here, larger amounts of initiator lead to copolymers having lower molecular weights. The monomers D and/or E, F and G can also be copolymerized in the absence of polymerization initiators at temperatures above 200° C. Thus, the use of initiators is not absolutely essential since these monomers readily undergo free radical polymerization also in the absence of initiators at temperatures above 200° C. Suitable polymerization initiators are, for example, di-tert-butyl peroxide, acetylcyclohexanesulfonyl peroxide, diacetyl peroxydicarbonate, dicyclohexyl peroxydicarbonate, di-2-ethylhexyl peroxydicarbonate, tert-butyl perneodecanoate, 2,2'-azobis(4-methoxy-2,4-dimethylvaleronitrile), tert-butyl perpivalate, tert-butyl per-2-ethylhexanoate, tert-butyl permaleate, 2,2'-azobis(isobutyronitrile), bis-(tert-butylperoxy)cyclohexane, tert-butyl peroxyisopropylcarbonate, tert-butyl peracetate, di-tert-butyl peroxide, di-tert-amyl peroxide, cumyl hydroperoxide and tert-butyl hydroperoxide. The initiators may be used alone or as a mixture with one another. In the mass polymerization, they are introduced into the polymerization reactor preferably separately or in the form of a solution or emulsion in the monoolefin. In the case of the copolymerization, it is of course also possible concomitantly to use redox coinitiators, for example benzoin, dimethylaniline, ascorbic acid and complexes of heavy metals, such as copper, cobalt, iron, manganese, nickel and chromium, which complexes are soluble in organic solvents. The concomitant use of redox coinitiators makes it possible to carry out the polymerization at a lower temperature. The amounts of redox coinitiators usually used are about 0.1 to 2,000, preferably 0.1 to 1,000, ppm, based on the amounts of monomers used. If the monomer mixture undergoes initial polymerization at the lower limit of the temperature range suitable for the polymerization and then undergoes complete polymerization at a higher temperature, it is expedient to use at least two different initiators which decompose at different temperatures, so that a sufficient concentration of free radicals is available in each temperature interval.

The copolymerization is carried out in conventional polymerization apparatuses, for example in a pressure-resistant vessel which is provided with a stirrer, in pressure-resistant stirred vessel cascades or in a tube reactor. In the case of mass polymerization, the monomers are preferably copolymerized in a molar ratio in the absence of solvents. The copolymerization can be carried out continuously or batchwise. For example, the olefin or a mixture of different olefins may be initially introduced into the reactor and heated to the desired polymerization temperature while stirring. As soon as the olefin or the olefin mixture has reached the polymerization temperature, the ethylenically unsaturated dicarboxylic anhydride is metered in. If an initiator is used, it is metered into the reaction mixture, preferably separately or dissolved in an olefin used for the polymerization. If it is used, the polymerization regulator is added to the polymerizing mixture either separately or likewise dissolved in an olefin. The anhydrides, in particular maleic anhydride, are preferably used in the form of a melt. The temperature of the melt is about 70° to 90° C. If the olefin is used in the copolymerization in excess, for example in a 10% excess, it can be removed at the end of copolymerization without difficulty from the copolymer melt with the aid of distillation, preferably under reduced pressure. The copolymer melt is then expediently directly further processed.

The copolymers thus prepared are subjected to solvolysis after cooling to room temperature or preferably in the form of the melt, which is at a temperature in the range from 80° to 180° C., preferably 90° to 150° C. In the simplest case, the solvolysis of the anhydride groups of the copolymers comprises hydrolysis and subsequent partial neutralization of the carboxyl groups formed during the hydrolysis. It is particularly advantageous to carry out the procedure in pressure-resistant apparatuses and then to convert the anhydride groups into carboxyl groups directly by adding water to a melt of the copolymers obtainable in the mass polymerization and to neutralize at least 10% of the carboxyl groups of the hydrolyzed copolymers by subsequent addition of bases. However, hydrolysis and neutralization may also be carried out virtually simultaneously by adding dilute aqueous bases to the copolymer melt. The amounts of water and of neutralizing agent are chosen so that emulsions or solutions which contain 10 to 60, preferably 20 to 55, % by weight of solids and are made commercially available are formed. Preparation solutions are then produced therefrom by dilution to solids contents of 0.5 to 50% by weight.

The copolymers obtainable by mass polymerization may also be hydrolyzed by adding primary amines of the formula H and/or secondary amines of the formula J. The hydrolysis is carried out with amounts of amines such that 10 to 50% of the carboxyl groups formed altogether from the polymerized dicarboxylic anhydride units (monomers D and E) in a complete hydrolysis are amidated. After the formation of semiamide groups in the copolymer, the neutralization is effected. It is continued until at least 10% of the carboxyl groups of the copolymer obtained in the mass polymerization are neutralized.

The hydrolysis can also be carried out by adding alcohols of the formula K to a melt of the copolymers obtainable in the mass polymerization. Here, the amounts of alcohol added are such that 10 to 50% of the carboxyl groups formed altogether from the polymerized dicarboxylic acid units are esterified. A neutralization is then carried out, in which at least 10% of the carboxyl groups formed altogether from the copolymer containing anhydride groups are neutralized.

In each case 25 to 50% of the carboxyl groups formed altogether from the polymerized dicarboxylic anhydrides are preferably amidated or esterified. Suitable neutralizing agents are, for example, ammonia and amines, which are used for amidating the copolymers, alkali metal and alkaline earth metal hydroxides, for example sodium hydroxide, potassium hydroxide, magnesium hydroxide, calcium hydroxide or barium hydroxide. The neutralization is preferably carried out by adding aqueous sodium hydroxide solution to the copolymer. The neutralization of the copolymers containing anhydride groups is carried out at least to a degree such that water-dispersible copolymers are obtained. This degree of neutralization corresponds to at least 10% of the carboxyl groups formed altogether from the anhydride groups.

Primary amines of the formula H and/or secondary amines of the formula J may be used for the amide formation. The amide formation is preferably effected in the presence of water by reaction of the anhydride groups of the copolymer with the amines. The suitable primary and secondary amines may have 1 to 40, preferably 3 to 30, carbon atoms. Suitable amines are, for example, methylamine, ethylamine, n-propylamine, isopropylamine, n-butylamine, isobutylamine, hexylamine, cyclohexylamine, methylcyclohexylamine, 2-ethylhexylamine, n-octylamine, isotridecylamine, tallow fatty amine, stearylamine, oleylamine, dimethylamine, diethylamine, di-n-propylamine, diisopropylamine, di-n-butylamine, diisobutylamine, dihexylamine, dicyclohexylamine, dimethylcyclohexylamine, di-2-ethylhexylamine, di-n-octylamine, diisotridecylamine, di-(tallow fatty) amine, distearylamine and dioleylamine.

In order partially to esterify the copolymers obtained in the mass polymerization and containing anhydride groups, said copolymers are reacted with alcohols. The esterification, too, is preferably effected in the absence of water. Suitable alcohols may contain 1 to 40, preferably 3 to 30, carbon atoms. Primary, secondary and tertiary alcohols may be used. Both saturated aliphatic alcohols and nonsaturated alcohols, such as, for example, oleyl alcohol, may be used. Monohydric, primary or secondary alcohols, for example methanol, ethanol, n-propanol, isopropanol, n-butanol, isobutanol, n-pentanol and isomers, n-hexanol and isomers, n-octanol and isomers, such as, for example, 2-ethylhexanol, nonanols, decanols, dodecanols, tridecanols, cyclohexanol, tallow fatty alcohol, stearyl alcohol and the alcohols or alcohol mixtures having 9 to 19 carbon atoms and readily obtainable industrially by oxo synthesis, such as, for example, $C_{9/11}$ oxo alcohol, $C_{12/15}$ oxo alcohol and Ziegler alcohols which are known under the name alfol and have 12 to 24 carbon atoms, are preferably used. Alcohols having 4 to 24 carbon atoms, such as, for example, n-butanol, isobutanol, amyl alcohol, 2-ethylhexanol, tridecanol, tallow fatty alcohol, stearyl alcohol, $C_{9/11}$ oxo alcohol, $C_{13/15}$ oxo alcohol, $C_{12/14}$ alfols and $C_{16/18}$ alfols are preferably used.

After the partial conversion of the anhydride groups into semiamide or half-ester groups, the hydrolysis of the anhydride groups of the copolymer which are still present is carried out. The hydrolysis of the remaining anhydride groups of the copolymer can also be carried out simultaneously with the partial neutralization still required, by adding an aqueous base to the partially amidated or esterified copolymer still containing anhydride groups. The amount of water and bases is chosen so that the concentration of the copolymer emulsion or solution is preferably 20 to 55% by weight. The pH is in the range from about 4 to 10.

The present invention furthermore relates to the use of the copolymers according to the invention as water repellents for leather and pelts.

The aqueous copolymer emulsions thus obtainable are stable and have a long shelf life. They are outstandingly suitable for the finishing of leathers and pelts because they have a particularly pronounced water repellent effect and moreover display a fatliquoring and retanning effect. The leathers and pelts treated with these copolymer emulsions show only little water absorptivity and water permeability. The emulsions simultaneously have a softening effect so that in most cases no additional fatliquor based on natural or synthetic fatliquoring oils is required. The emulsions impart good body and high tensile and tear propagation strengths to the goods, so that an additional treatment with commercial retanning agents, for example with vegetable tanning agents or synthetic organic tanning agents (synthans), based on phenolsulfonic acid/phenol/formaldehyde condensates, is no longer required in most cases.

A further advantage of the aqueous emulsions to be used according to the invention is that they contain no additional emulsifiers. It is known that leathers and pelts which have been treated with emulsifier-containing products must, after treatment with these agents, be subjected to expensive processes, such as, for example, aftertreatment with polyvalent metal salts, in order to render the emulsifiers ineffective in the leather or in the pelts.

The copolymer emulsions described above are suitable for the treatment of all conventional tanned hides, in particular hides tanned with mineral tanning agents, such as chromium(III) salts. The tanned hides are usually deacidified prior to the treatment. They may already have been dyed prior to the treatment. However, dyeing may also be carried out only after the water repellent treatment effected according to the invention.

The tanned hides are treated with the aqueous emulsions, expediently in aqueous liquor which is obtainable by diluting the copolymer emulsions with water, at a pH of 4 to 10, preferably 5 to 8, and temperatures of 20 to 60° C., preferably 30° to 50° C., during a period of 0.1 to 5, in particular 0.5 to 2, hours. This treatment is preferably effected by drumming. The required amount of copolymer emulsion is 0.1 to 30, preferably 1 to 20, % by weight, based on the shaved weight of the leather or the wet weight of the pelt. The liquor length, i.e. the percentage weight ratio of the treatment liquor to the goods, based on the shaved weight of the leather or on the wet weight of the pelt, is usually 10 to 1000%, preferably 30 to 250%, or 50 to 500% in the case of pelts.

After the treatment with the aqueous liquor described above, the pH of the treatment liquor is adjusted to a pH of 3 to 5, preferably 3.5 to 4, by adding acids, organic acids, such as formic acid, preferably being used.

When conventional retanning agents are concomitantly used in the process for finishing the leather and the pelts, the treatment with the aqueous emulsions to be used according to the invention can be carried out before or after the retanning step or in a plurality of stages, the aqueous emulsions being used proportionately before, during and after the retanning step. The aqueous emulsions to be used as water repellents can also be used together with conventional leather and pelt finishing agents, such as water repellent fatliquors based on paraffin and/or based on wool fat. In some cases, the water repellent, fatliquoring and retanning effect is thus improved.

The molecular weight of the copolymer is determined by gel permeation chromatography, tetrahydrofuran being used as the eluent and polystyrene fractions having a narrow molecular weight distribution being used for calibration. Testing of the treated leather for water absorptivity and water permeability is carried out using the Bally penetrometer according to the wet method IUP 10 of the International Union of the Leather Chemists' Associations, Commission for Physical Leather Testing, cf. das Leder [Leather], Volume 12, pages 36–40 (1961).

Preparation Examples a) Polymerization

In a steel reactor which is set up for polymerization and provided with a stirrer and metering apparatuses, amounts of $C_{20}$-$C_{22}$-α-olefin and fluoroolefin (1:1 mixture of perfluorooctylethene and perfluorooctylethene) which correspond to the data in Table 1 are initially introduced and are heated to 150° C. in a gentle stream of $N_2$ while stirring. As soon as the temperature has been reached, the initiator di-tert-butyl peroxide is added. Molten maleic anhydride is then metered in uniformly so that the reaction temperature does not exceed 190° C. Stirring is then continued for a further three hours at 150° C.

b) Hydrolysis and neutralization

Equimolar amounts, based on maleic anhydride (MA) used, of NaOH dissolved in demineralized water are added to the polymer melt which is at 150° C. and stirring is continued for 1 hour at 90° C. The amount of demineralized water is chosen so that a 25% strength polymer emulsion is present after solvolysis is complete.

Table 1:
Amounts used (in % by weight) for the polymerization

| Example | α-Olefin | Fluoro-olefin | MA | Di-tert-butyl peroxide |
|---|---|---|---|---|
| 1 | 72.5% | 0% | 25.0% | 2.5% |
| 2 | 70.0% | 2.5% | 25.0% | 2.5% |
| 3 | 67.5% | 5.0% | 25.0% | 2.5% |
| 4 | 65.0% | 7.5% | 25.0% | 2.5% |
| 5 | 60.0% | 12.5% | 25.0% | 2.5% |

A slightly viscous aqueous emulsion having a solids content of 25% is obtained in this manner. The molecular weight of the unhydrolyzed copolymer is 5000–6000 g/mol. 50 mol % of the total carboxyl groups available were neutralized.

Use Example

Chrome-tanned side leather having a shaved thickness of 1.8 mm is deacidified to a pH of 6.3. The resulting salts are rinsed out and the leather is drummed for one and a half hours at 45° C. with 12%, based on the shaved weight, of the emulsion originating from the preparation example. The pH is adjusted to 3.8 with formic acid. The leather is then washed, mechanically set out and dried.

The leather obtained is very soft and supple, has good body, is tight-grained and has both excellent dynamic and static water resistance (tested using the Bally penetrometer).

Table 2 shows the characteristics determined in comparison with a copolymer based on long-chain olefins and ethylenically unsaturated dicarboxylic anhydrides.

TABLE 2

| | | Example 1 | Example 2 | Example 3 | Example 4 | Example 5 |
|---|---|---|---|---|---|---|
| Dynamic water resistance | Water penetration after | 2 h 45 min | 3 h 45 min | 5 h 10 min | 5 h 20 min | 5 h 10 min |
| | Water absorption after 1 h | 37% | 24% | 20% | 18% | 17% |
| Static water resistance | Water droplet penetration time | 35 min | 1 h 50 min | 3 h | 3 h 20 min | 3 h 50 min |

We claim:

1. A copolymer comprising:

a) 10 to 60% by weight of bivalent structural units of the formula A

wherein $R^1$ and $R^2$, independently of one another, are hydrogen or $C_1$–$C_6$-alkyl, a and b are zero or one and a+ b is one, X and Y are identical or different and are i) the group —NR—HR$^3$, where $R^3$ is $C_1$–$C_{40}$-alkyl, $C_3$–$C_{40}$-alkenyl, $C_5$–$C_{20}$-cycloalkyl or $C_6$–$C_{18}$-aryl, ii) the group —N—R$^3)_2$; where $R^3$ are identical or different and have the abovementioned meaning, iii) the group —O—R$^4$, where $R^4$ is hydrogen, an alkali metal cation, one equivalent of an alkaline earth metal ion, a cation of the formula $H_2N^{\oplus}(R^3)_2$ or $H_3N^{\oplus}R^3$, $C_1$–$C_{40}$-alkyl, $C_5$–$C_{20}$-cycloalkyl or $C_6$–$C_{18}$-aryl, or iv) mixtures of i), ii) or iii), b) 30 to 89% by weight of bivalent structural units of the formula B

wherein $R^5$ is hydrogen or $C_1$–$C_4$-alkyl and $R_6$ is $C_6$–$C_{40}$-alkyl or $C_6$–$C_{18}$-aryl, and c) 1 to 20% by weight of bivalent structural units of the formula C

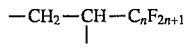 (C)

wherein n is a number from 6 to 24.

2. A copolymer as claimed in claim 1, comprising:

20 to 40% by weight of bivalent structural units of the formula A, 50 to 79% by weight of bivalent structural units of the formula B and 1 to 10% by weight of bivalent structural units of the formula C.

3. A copolymer as claimed in claim 1, wherein, in the bivalent structural units of the formula A, $R^1$ and $R^2$ are hydrogen, $R^3$ is $C_3$–$C_{30}$-alkyl or $C_3$-14 $C_{30}$-alkenyl and $R^4$ is hydrogen, an alkali metal cation or a mixture thereof.

4. A copolymer as claimed in claim 1, which has a molecular weight ($M_w$) of 500 to 2000 g/mol.

* * * * *